March 20, 1962 M. G. CLAY 3,026,012
WIRE GUIDE FOR SPRING-COILING MACHINES
Filed May 13, 1960 2 Sheets-Sheet 1
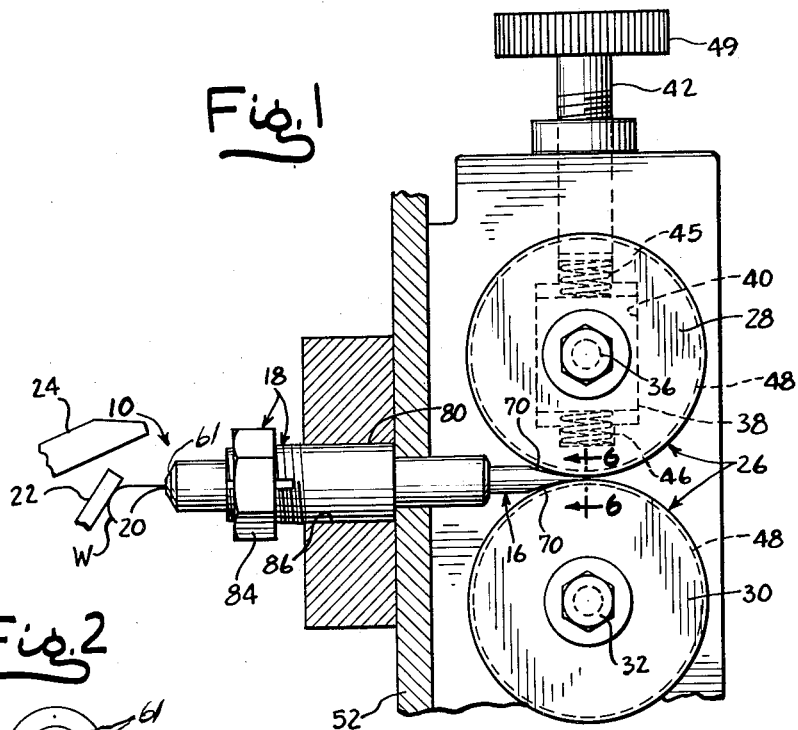
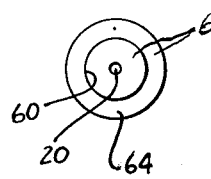
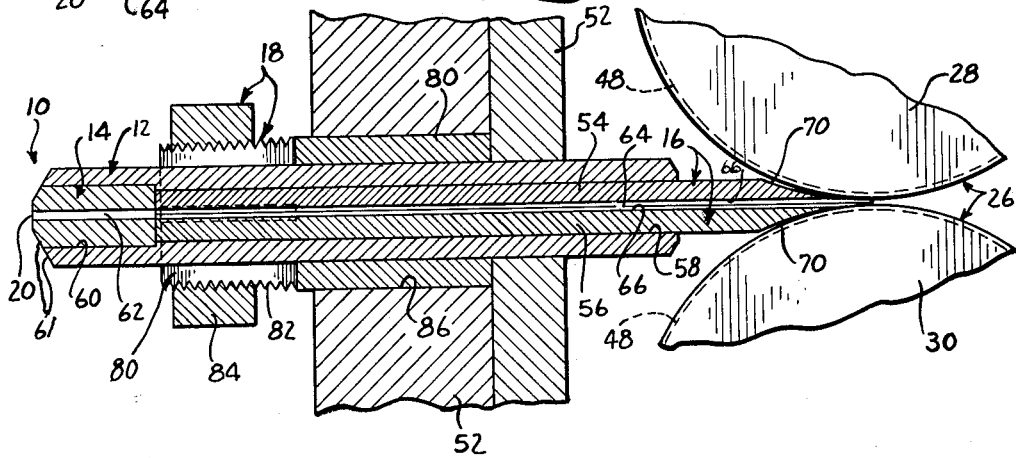
INVENTOR.
MURRAY G. CLAY
BY
ATTY.

March 20, 1962  M. G. CLAY  3,026,012
WIRE GUIDE FOR SPRING-COILING MACHINES
Filed May 13, 1960  2 Sheets-Sheet 2
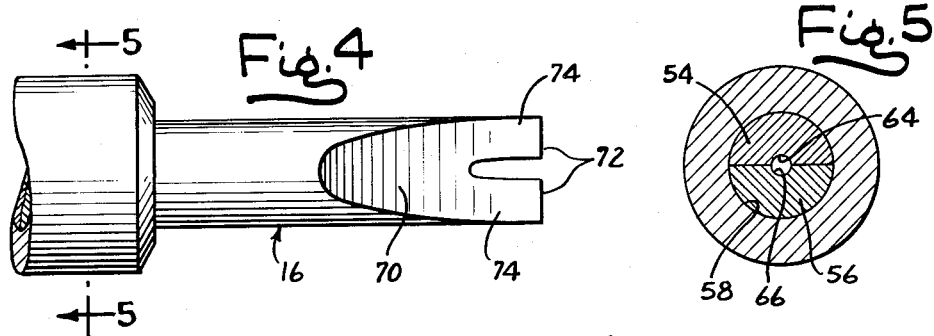
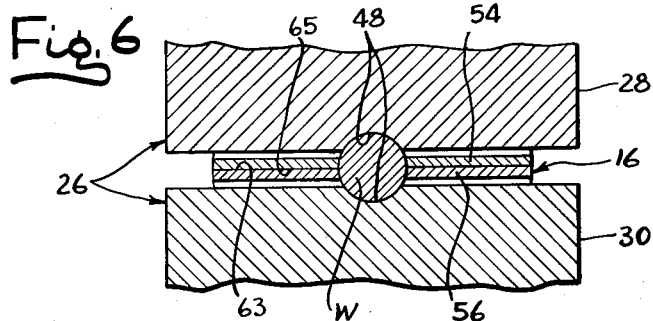
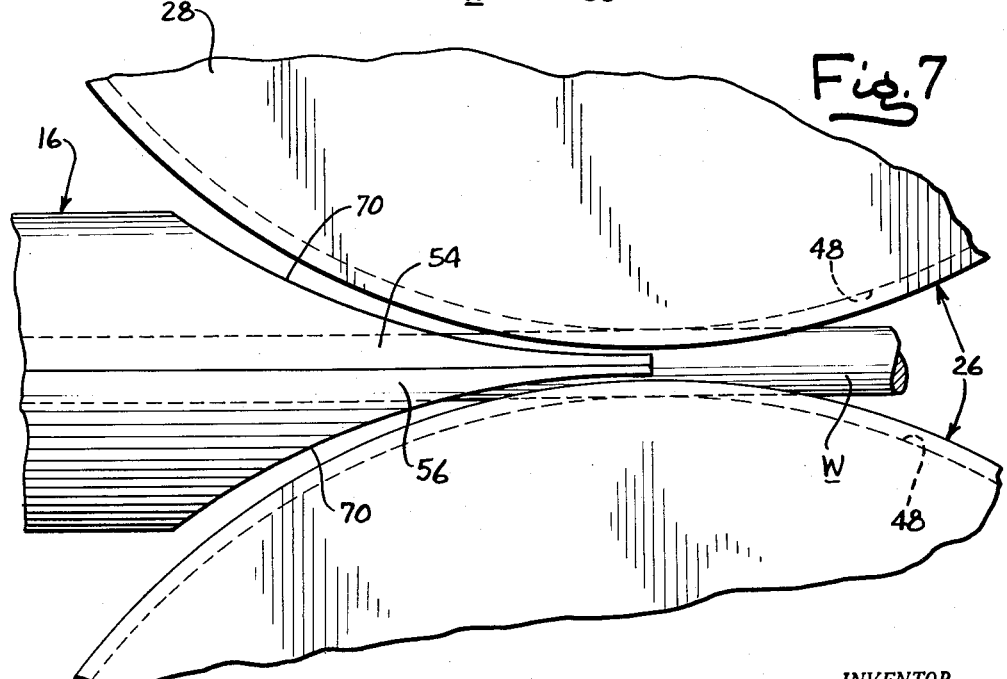
INVENTOR.
MURRAY G. CLAY
BY
ATTY.

United States Patent Office 3,026,012
Patented Mar. 20, 1962

3,026,012
WIRE GUIDE FOR SPRING-COILING MACHINES
Murray G. Clay, 1040 Lake Shore, Evanston, Ill.
Filed May 13, 1960, Ser. No. 28,943
9 Claims. (Cl. 226—187)

The present invention relates generally to wire-forming machines, and has particular reference to a machine of the type in which a hardened steel wire is fed from a guide member or quill and caused to impinge against a suitable tool to cause deflection and coiling of the wire as it is fed. Specifically, the invention relates to a novel composite wire guide or quill assembly through which the wire is forced and having a terminal orifice from which the wire issues immediately prior to its impingement against the forming tool at a forming station.

The invention is illustrated herein as embodied in a machine of the type disclosed in my co-pending United States patent application Serial No. 705,522, filed on December 27, 1957 and entitled, "Wire Forming Machine Mechanism With Selectively Operable Forming Tools." In such application, there has been disclosed a fully automatic cyclicly operable wire-shaping mechanism which embodies means whereby a continuous length of spring wire stock is forcibly projected through an elongated confining bore provided in a guide member or quill and allowed to issue from a discharge orifice at a forming station. At the forming station, a series of wire-forming tools are selectively brought into forming register with the orifice, either singly or in groups of two or more tools, at appropriate times in the machine cycle to produce a predetermined spring form, after which a cut-off knife is caused to sever the completed spring form from the tip of the quill at the orifice. Such a machine cycle is repeated indefinitely. The invention is, however, susceptible to other uses and wire guides or quills constructed in accordance with the principles of the present invention may, with or without modification, be employed in connection with other types of spring-coiling machines which require that a wire be fed linearly against a forming tool. Irrespective, however, of the particular use to which the invention may be put, the essential features thereof are at all times preserved.

The improved composite wire-guiding quill comprising the present invention has been designed to fit the requirements of a machine which employs for wire-feeding purposes a pair of feed rolls including tangentially arranged, peripherally grooved rollers. The machine of my co-pending application, mentioned above, as well as many other types of commercial spring-making machines, employ such feed rolls, together with means for intermittently driving the same so that during each actuation of the rolls, a predetermined exact length of wire stock is run between the tangentially disposed rollers and forced forwardly through a small bore provided in a wire guide or quill.

In machines of this character, a change-over from wire stock of a given diameter to wire stock of a different diameter necessitates considerable machine adjustment. Due to the fact that the axis of one feed roller is usually fixed while the axis of the other is adjustable toward and away from the fixed axis, any adjustment of the feed rolls for wire size may cause misalignment between the axis of the quill bore and the region of tangency of the rollers, thus necessitating adjustment either of the quill holder or of the mounting for the pair of feed rolls so that the latter may be shifted bodily as a unit to bring the quill and tangent point into alignment. Such adjustments are costly, both from the standpoint of the mechanism involved and the time consumed in making the adjustments.

Another limitation that is attendant upon the construction and use of conventional wire-coiling machines resides in the use of plural wire guides including a terminal wire guide and an intermediate wire guide which conducts the wire stock from the feed rolls to the terminal guide. For change-over operations to accommodate different wire diameters, substitution and adjustment of both the quill and the intermediate wire guide are necessary.

The present invention is designed to overcome the abovenoted limitations that are attendant upon the construction and use of conventional wire-feeding and guiding mechanisms, and toward this end, the invention contemplates the provision of a novel composite wire guide or quill for spring-coiling machines employing tangential feed rolls including a roller having a fixed axis and a roller having an axis movable with respect to the fixed axis, as outlined above, the quill having associated therewith a replaceable flexible resilient bore-defining liner which is self-aligning with the region of tangency between the two feed rollers. The liner is replaceable in case of wear. The body of the quill which houses or contains the liner is adapted to be clamped in a fixed position relative to the machine framework and, when operatively received therein, the liner presents a tapered wire-receiving end which may, under certain circumstances, bear against and making running contact with the feed roller having the shiftable axis in such a manner that it will follow the bodily movements of the latter and thus become self-aligning with the region of feed roller tangency. By such an arrangement, no thought need be given to careful adjustment of the quill bodily for alignment purposes, it being necessary merely to make the required feed roller adjustment at which time the liner will automatically align itself with the region of tangency between the feed rollers.

The provision of a composite quill assembly of the character briefly outlined above being among the principal objects of the invention, it is a further object to provide such a quill wherein the liner is self-aligning not only for different feed roller spacing, but also is self-aligning for accurate nesting within the feed roller approaches where the peripheries of the two feed rollers converge toward the point of tangency so that the receiving end of the liner may extend close to the point of tangency with no danger of binding against the feed rollers. By such an arrangement, no rotational adjustment of the quill body need be made to make the liner fit the approaches of the feed rollers.

A still further object of the invention is to provide a composite quill of this character which serves as the sole wire-guiding means for conducting the wire stock from the feed roller orifice to the wire-discharging quill orifice at the forming station, thus eliminating the necessity of employing intermediate wire guides, which, themselves, require adjustment each time they are replaced.

Yet another object is to provide a composite quill assembly wherein the wire-receiving end thereof is more intimately associated with the peripheral regions of the tangentially disposed feed rollers than has heretofore been possible in connection with the usual intermediate wire guides so that the extreme wire-receiving end of the quill may closely approach the point of tangency between the feed rollers, thus avoiding the the possibility of the existence of a free unsupported span or bight portion of the wire stock in the immediate vicinity of the region of tangency between the feed rollers. In this manner, the existence of a solid column of the wire stock undergoing feeding which extends from the feed roller orifice to the quill orifice is assured.

Numerous other objects and advantages of the invention, not at this time enumerated, will become more readily apparent as the nature of the invention is better understood.

In the accompanying two sheets of drawings forming a part of this specification, one illustrative embodiment of the invention has been shown.

In these drawings:

FIG. 1 is a fragmentary side elevation view, partly in section, of a portion of a wire-forming machine in the vicinity of the wire-feeding and wire-forming stations and showing the improved composite quill assembly of the present invention operatively applied thereto;

FIG. 2 is an end elevational view of the quill assembly shown in FIG. 1;

FIG. 3 is an enlarged fragmentary sectional view taken substantially vertically and centrally through a portion of the structure shown in FIG. 1;

FIG. 4 is a fragmentary top plan view of an end region of the composite quill assembly;

FIG. 5 is a sectional view taken substantially along the line 5—5 of FIG. 4;

FIG. 6 is an enlarged sectional view taken substantially along the line 6—6 of FIG. 1; and FIG. 7 is an enlarged fragmentary side elevational view, schematic in its representation, of the wire-receiving end region of the quill assembly in the vicinity of the feed rollers, and illustrating the manner in which the quill is self-aligning with respect to such feed rollers.

Referring now to the drawings in detail, and in particular to FIG. 1, the novel wire-forming guide or quill of the present invention has been designated in its entirety at 10 and it is shown as being operatively applied to a wire-forming machine of the type shown and described in my co-pending application Serial No. 705,522, referred to above. This environment for the quill 10 is purely exemplary since the quill is capable, with or without modification as required, of being applied to the other types of wire-forming machines.

Briefly, the quill 10 is in the form of a composite assembly of four parts, including a quill body 12 (FIG. 3), a quill tip 14, and a two-piece replaceable composite quill liner 16. The quill assembly 10 is adapted to be removably mounted on a portion of the machine framework so that it will assume a fixed position with respect to the wire-feeding mechanism of the machine, its removability being for the purpose of quill substitution or of inspection of parts. The sole means for removably maintaining the quill assembly 10 in its operative position in the machine comprises a collet assembly 18 and the installation of the quill in position may thus be accomplished by a minimum of adjustment procedure as will become clear presently.

For a full disclosure of a spring-forming machine of the type fragmentarily illustrated in FIG. 1, as an environment for the present invention, reference may be had to my abovementioned co-pending application. It is deemed sufficient for purposes of description herein to state that such a machine is predicated upon the positive forcing of a continuous length of spring wire stock W (FIGS. 6 and 7) through an elongated confining bore, exemplified by the bore 20 herein, and provided in a wire guide, exemplified by the quill assembly 10 of the present invention, while simultaneously driving the wire as it issues from the orifice 20 at the forward end of the bore against a series of wire-forming tools, only one of which has been shown herein at 22, and which are selectively brought into forming register with the end of the bore at appropriate times in the machine cycle to produce a predetermined spring form, and thereafter, severing the wire by means of a cut-off knife 24, and repeating the machine cycle immediately after the severing operation without stopping the machine.

The wire stock W is fed to the quill 10 by means of a pair of feed rolls 26, including upper and lower feed rollers 28 and 30, respectively. The lower roller 30 is rotatable about a fixed axis while the upper roller 28 is adjustable vertically toward and away from the axis of the fixed lower roller 30 so that the distance between the two substantially tangentially arranged rollers may be adjusted to accommodate the feeding of wire stock of varying diameters, as will be made clear presently.

The fixed axis of the lower roller 30 is established by the provision of a feed roll shaft 32 which extends across the machine framework. The feed roll shaft 36 for the upper feed roller 28 is rotatably journalled in a block 38 which is vertically slidable in a slot 40 suitably formed in the framework 34. An adjusting screw 42 controls the vertical movements of the block 38 and is provided with a manipulating hand wheel 49. The block is sandwiched between upper and lower springs 45 and 46 in such a manner that when the hand wheel 49 is turned in one direction to relieve the compression of the spring 45, the spring 46 asserts itself to raise the block 38 and thus elevate the upper feed roller 28 to increase the distance between the two feed rollers. When the hand wheel 49 is turned in the other direction to compress the spring 45, the spring 46 yields and permits the feed rollers to grip the wire stock W therebetween for feeding purposes. The two feed rollers 28 and 30 are peripherally grooved as at 48, the two grooves being in vertical register with each other so that at the region where the feed rollers are approximately tangential, a small bore or orifice (see also FIG. 6) is created and through which the wire stock W passes with the stock W being frictionally gripped between the trough portions of the two grooves. The specific means for adjusting the upper feed roller 28 toward and away from the lower feed roller as described above forms no part of the present invention and other means for effecting feed roller adjustment may be employed if desired.

It will be understood that suitable means must be provided for effecting intermittent driving of the feed rollers 28 and 30 in opposite directions respectively. The driving means has not been disclosed herein since such a means has been fully illustrated and described in my co-pending application, above referred to, and to which application reference may be had for the disclosure.

Still referring to FIG. 1, the quill assembly 10 of the present invention is operatively disposed on a front plate 52 which forms a part of the machine framework, the previously mentioned collet assembly 18 serving to releasably hold the composite quill in its operative position on the plate. The feed rollers 28 and 30 are disposed rearwardly of the front plate 52 and the quill 10 projects completely through the front plate (see also FIG. 2) and into the forming station where the quill presents its quill orifice 20 to the various forming tools as the latter are selectively brought into register with such orifice.

The composite quill assembly 10 involves in its general organization only the four component parts mentioned above, which are, namely, the quill body 12, the tip 14 and the two liner sections of the quill liner 16, these sections being designated at 54 and 56, respectively. The quill body 12 is in the form of a tubular member or sleeve which preferably is formed of steel. A central bore 58 extends completely through the sleeve and is provided with a counterbore 60. The counterbore 60 has pressed thereinto, so as to completely fill the same, the previously mentioned quill tip 14.

The quill tip 14 is in the form of a relatively hard tubular cylindrical member, preferably formed of tungsten carbide, having a central bore 62 therethrough of a diameter which will accommodate the diameter of the wire undergoing feeding, the forward end of the quill tip 14 and the forward end of the quill body 12 may be machined together to impart a desired shape characteristic to the quill as a whole. In the present illustrated form of the invention, these members are machined to provide a truly conical front end face 61, but it will be understood that, depending upon the nature of the spring shape to be formed, the front end of the quill may be otherwise machined.

The composite two-piece liner 16 includes the upper and lower liner sections 54 and 56, respectively, previously mentioned. The two sections are identical in configuration and each is in the form of an elongated half-cylinder having opposed faces 63 and 65 which are ground or flat. When the two sections 54 and 56 are assembled upon each other with the faces 63 and 65 in face-to-face coextensive contact, they provide an elongated tubular structure having a central bore 64 extending axially therethrough. The bore 64 exists by virtue of an elongated shallow groove 66 which is formed in each face 63 and 65, the two grooves moving into register when the sections are assembled upon each other. The overall diameter of the tubular structure, i.e., the composite liner 16, is such that the liner may be telescopically received in the bore 58 with a fairly snug fit, but with sufficient clearance that the liner is capable of turning movement within the bore 58.

The rear end of the two-piece liner is hollow ground as indicated at 70 (FIGS. 3 and 4) on a radius only slightly greater than the radius of the feed rollers 28 and 30, these two rollers having the same radius. Thus, the rear end of the composite liner 16 terminates in a relatively thin edge 72 which is interrupted where the bore 66 intersects the hollow ground faces 70. The two sections 54 and 56 are formed of spring steel so that the composite liner 16 as a whole is capable of limited flexing movement for a purpose that will be made clear presently.

From the above description of the composite liner 16, it will be seen that because of the hollow ground faces 70, the extreme rear linear edge 72 of the liner may be extended into the approaches of the tangentially disposed feed rollers 28 and 30 so that the rear edge 72 of the liner closely approaches a vertical plane passing through the centers of the two rollers. The intersection of the bore 66 with the hollow ground surfaces 70 establishes two lips 74 (FIG. 4) on opposite sides of the bore 66. The various parts are so designed that the minimum thickness of the lips 74 (i.e., their thickness at their intersection with the edge 72), when added to the combined depth of the two peripheral grooves 48, is slightly less than the diameter of the wire undergoing feeding and, consequently, of the liner bore 64. Thus, the lips 74 are normally maintained out of contact with the peripheries of the feed rollers 28 and 30 when the axis of the quill 10 is in exact horizontal register with the center of the wire stock passing through the feed roll orifice.

The quill assembly 10 is adapted to be removably mounted on the front plate 52 by means of the collet assembly 18, this assembly including a collet sleeve 80 the forward split end region of which is threaded as at 82 for reception thereover of a clamping nut 84. The sleeve 80 is pressed into a hole 86 provided in the front plate 52. The hole 86 is formed in the plate 52 at an elevation calculated to maintain the hollow ground end of the quill liner assembly 16 in precise horizontal register with the region of approximate tangency of the feed rollers 28 and 30 as previously described.

From the above description, it will be seen that in order to replace the quill assembly 10, it is merely necessary to loosen the collet assembly 18 and slide the composite quill axially from the collet sleeve 80, after which a different quill assembly may be installed by a reversal of the procedure. In the installation of any given quill assembly 10, if the front end face 64 of the quill body and tip is uniform or symmetrical about an angle of 360°, no care need be taken with respect to circumferential adjustment of the quill and the latter may simply be slid into position through the collet assembly. If the end face 64 is specially machined for specific spring-forming purposes, it may then be necessary to take into consideration the necessary circumferential adjustment of the quill. In either event, the quill is slid longitudinally through the collet sleeve 80 and the rear end regions of the two-piece liner 16 are brought into close proximity to the region of approximate tangency of the two feed rollers 28 and 30. Since the liner 16 is freely rotatable within the bore 58 of the quill body 12, the lips 74 and hollow ground surfaces 70 are self-aligning against the peripheries of the feed rollers 28 and 30.

It is to be noted that since the two sections 54 and 56 of the two-piece liner 16 are formed of flexible spring steel, the liner may yield slightly to accommodate any undue manufacturing tolerances or initial machine adjustments wherein the extreme rear end of the two-piece liner is, after installation of the quill assembly, a few thousandths of an inch too high or too low for exact registry with the region of approximate tangency of the feed rollers 28 and 30. Additionally, because of the flexibility of the liner 16, no special adjustments need be made to accommodate changes in wire diameter.

Since certain obvious changes may be made in the illustrated composite quill assembly without departing from the scope of the invention, it is intended that all matter contained herein be interpreted in an illustrative and not a limiting sense.

Having thus described the invention what I claim as new and desire to secure by Letters Patent is:

1. In a spring-coiling machine, the combination with a pair of peripherally grooved wire-engaging feed rollers disposed in substantially tangential relationship with respect to each other so as to provide therebetween a feed roll orifice at the region of approximate tangency between the rollers and through which orifice the wire passes upon rotation of the feed rollers in opposite directions respectively, of a quill assembly for guiding the wire from said feed roll orifice to a wire-forming station, said quill assembly comprising an elongated sleeve having front and rear end faces and provided with a central axial bore therethrough, the forward end of said sleeve being provided with means forming a circular quill orifice in intersecting relation with the front end of said sleeve, and a tubular liner telescopically disposed within said bore and having a wire-guiding bore extending completely therethrough axially and centrally thereof, the forward end of said latter bore being in register with the quill orifice, the rear end region of said liner projecting outwardly and rearwardly beyond the rear end face of the sleeve and having its extreme rear end region hollow ground on a radius slightly greater than the individual radius of either feed roller, said hollow ground end region of the liner terminating in a thin edge which is disposed within the approaches to said feed rollers and and in close proximity to a plane passing through the centers of the feed rollers and at a right angle to the common plane of the latter and with the bore of the liner in substantial register with said feed roll orifice.

2. In a spring-coiling machine, the combination set forth in claim 1, wherein said tubular liner is freely rotatable within the bore of said sleeve for self-alignment of the rear end region thereof with the approaches to said feed rollers.

3. In a spring-coiling machine, the combination with a pair of peripherally grooved wire-engaging feed rollers disposed in substantially tangential relationship with respect to each other so as to provide therebetween a feed roll orifice at the region of approximate tangency between the rollers and through which orifice the wire passes upon rotation of the feed rollers in opposite directions respectively, of a quill assembly for guiding the wire from said feed roll orifice to a wire-forming station, said quill assembly comprising an elongated sleeve having front and rear end faces and provided with a central axial bore therethrough, the forward end of said sleeve being provided with means forming a circular quill orifice in intersecting relation with the front end face of said sleeve, and a two-piece longitudinally split tubular liner telescopically disposed within said bore, said liner including a pair of substantially semi-cylindrical liner sections having flat opposed faces disposed in coextensive face-to-face contact, said faces each being formed with a longitudinally extending groove therein, which grooves, when the faces are in contact, define therebetween a longitudinal wire-guiding liner bore, the forward end of said liner bore being in register with the quill orifice, the rear end region of said liner projecting outwardly and rearwardly beyond the rear end face of the sleeve, the rear end region of each liner section having the side thereof remote from its flat face hollow ground, said hollow ground end regions of the liner sections defining an edge which is disposed within the approaches to said feed rollers and in close proximity to a plane passing through the centers of the feed rollers and at right angles to the common plane of the latter and with the bore of the liner in substantial register with said feed roll orifice.

4. In a spring-coiling machine, the combination set forth in claim 3, wherein said two-piece tubular liner is possessed of limited flexibility and is freely rotatable within the bore of said sleeve for self-alignment of the rear end region of the liner with the approaches to said feed rollers.

5. In a spring-coiling machine, the combination set forth in claim 3, wherein said two-piece tubular liner is possessed of limited flexibility and is freely rotatable within the bore of said sleeve for self-alignment of the rear end region thereof with the approaches to said feed rollers, and wherein the combined thicknesses of the hollow ground end regions of the liner sections at the extreme rear ends thereof and the combined depth of the peripheral grooves in said feed rollers is slightly less than the diameter of the wire-guiding bore in said liner.

6. In a spring-coiling machine, the combination with a pair of peripherally grooved wire-engaging feed rollers disposed in substantially tangential relationship with respect to each other so as to provide therebetween a feed roll orifice at the region of approximate tangency between the rollers and through which orifice the wire passes upon rotation of the feed rollers in opposite directions respectively, of a quill assembly for guiding the wire from said feed roll orifice to a wire-forming station, said quill assembly comprising an elongated sleeve having front and rear end faces and provided with a relatively large central axial bore therethrough having an enlarged counterbore at the forward end thereof, a hardened quill tip pressed into said counterbore and substantially filling the same, said quill tip being formed with a central axially extending wire-guiding bore therethrough the forward end of which defines a quill orifice, and an elongated flexible tubular liner telescopically disposed within the bore of said sleeve and having a wire-guiding bore extending therethrough axially and centrally thereof, the forward end of said latter bore being in register with the rear end of the bore in said quill tip, the rear end region of said liner projecting outwardly and rearwardly beyond the rear end face of the sleeve and having its extreme rear end region hollow ground on a radius slightly greater than the individual radius of either feed roller, said hollow ground end region of the liner terminating in a thin edge which is disposed within the approaches to said feed rollers and in close proximity to a plane passing through the centers of the feed rollers and at a right angle to the common plane of the latter and with the bore of the liner in substantial register with said feed roll orifice.

7. In a spring-coiling machine, the combination set forth in claim 6, wherein said tubular liner is freely rotatable within the bore of said sleeve for self-alignment of the rear end region with the approaches to said feed rollers.

8. In a spring-coiling machine, the combination set forth in claim 6, wherein said tubular liner is of two-piece longitudinally split construction and comprises a pair of substantially semi-cylindrical liner sections having flat opposed faces disposed in coextensive face-to-face contact, said faces each being formed with a longitudinally extending groove therein, said grooves, when the faces are in contact, defining therebetween the wire-guiding liner bore.

9. In a spring-coiling machine, the combination set forth in claim 6, wherein said tubular liner is of two-piece construction and is longitudinally split to provide a pair of substantially semi-cylindrical liner sections having flat opposed sides disposed in coextensive face-to-face contact, said faces each being termed with a longitudinally extending groove therein, said grooves, when the faces are in contact, defining therebetween the wire-guiding liner bore, said liner being freely rotatable within the bore of said sleeve for self-alignment of the rear end region of the liner with the approaches to said feed rollers.

References Cited in the file of this patent
UNITED STATES PATENTS

| | | |
|---|---|---|
| 1,135,239 | Wilcox | Apr. 13, 1915 |
| 2,786,674 | Heijnis et al. | Mar. 26, 1957 |

UNITED STATES PATENT OFFICE
CERTIFICATE OF CORRECTION

Patent No. 3,026,012                          March 20, 1962

Murray G. Clay

It is hereby certified that error appears in the above numbered patent requiring correction and that the said Letters Patent should read as corrected below.

In the grant, lines 1 to 3, for "Murray G. Clay, of Evanston, Illinois," read -- Murray G. Clay, of Evanston, Illinois, assignor to The Baird Machine Company, of Stratford, Connecticut, a corporation of Connecticut, --; line 12, for "Murray G. Clay, his heirs" read -- The Baird Machine Company, its successors --; in the heading to the printed specification, line 3, for "Murray G. Clay, 1040 Lake Shore, Evanston, Ill." read -- Murray G. Clay, Evanston, Ill., assignor to The Baird Machine Company, Stratford, Conn., a corporation of Connecticut --.

Signed and sealed this 24th day of July 1962.

(SEAL)
Attest:

ERNEST W. SWIDER                        DAVID L. LADD

Attesting Officer                         Commissioner of Patents